United States Patent
Marson et al.

(10) Patent No.: US 11,416,625 B2
(45) Date of Patent: Aug. 16, 2022

(54) PROTECTING CRYPTOGRAPHIC KEYS STORED IN NON-VOLATILE MEMORY

(71) Applicant: CRYPTOGRAPHY RESEARCH, INC., San Jose, CA (US)

(72) Inventors: Mark Evan Marson, Carlsbad, CA (US); Michael A. Hamburg, San Francisco, CA (US)

(73) Assignee: CRYPTOGRAPHY RESEARCH, INC., San Jose, CA (US)

( * ) Notice: Subject to any disclaimer, the term of this patent is extended or adjusted under 35 U.S.C. 154(b) by 188 days.

(21) Appl. No.: 16/963,724

(22) PCT Filed: Jan. 30, 2019

(86) PCT No.: PCT/US2019/015765
§ 371 (c)(1),
(2) Date: Jul. 21, 2020

(87) PCT Pub. No.: WO2019/152461
PCT Pub. Date: Aug. 8, 2019

(65) Prior Publication Data
US 2021/0081547 A1    Mar. 18, 2021

Related U.S. Application Data

(60) Provisional application No. 62/679,317, filed on Jun. 1, 2018, provisional application No. 62/624,694, filed on Jan. 31, 2018.

(51) Int. Cl.
*G06F 21/60*       (2013.01)
*G06F 1/24*        (2006.01)
(Continued)

(52) U.S. Cl.
CPC .............. *G06F 21/602* (2013.01); *G06F 1/24* (2013.01); *G06F 12/1408* (2013.01);
(Continued)

(58) Field of Classification Search
CPC ...... G06F 21/602; G06F 1/24; G06F 12/1408; G06F 21/79; H04L 9/0822; H04L 9/0894
See application file for complete search history.

(56) References Cited

U.S. PATENT DOCUMENTS 5,363,447 A * 11/1994 Rager ................... H04L 9/0894
380/273
6,292,899 B1    9/2001 McBride
(Continued)

FOREIGN PATENT DOCUMENTS

| EP | 0671090 A1 | 9/1995 |
| KR | 2012-0109041 A | 10/2012 |
| WO | WO-94-13080 A1 | 6/1994 |

OTHER PUBLICATIONS

EP Extended European Search Report dated Oct. 15, 2021 re: EP Appln. No. 19746781.4. 10 pages.
(Continued)

*Primary Examiner* — Ayoub Alata
(74) *Attorney, Agent, or Firm* — Lowenstein Sandler LLP

(57) ABSTRACT

Systems and methods for protecting cryptographic keys stored in a non-volatile memory. An example method may comprise: storing a device root key in a non-volatile memory; storing a volatile key in a volatile memory; storing a masked cryptographic key in the non-volatile memory, wherein the masked cryptographic key is produced by combining a cryptographic key and the device root key; storing a masked device root key in the non-volatile memory, wherein the masked root key is produced by combining the device root key and the volatile key; and erasing the device root key from the non-volatile memory.

20 Claims, 6 Drawing Sheets

(51) Int. Cl.
*G06F 12/14* (2006.01)
*G06F 21/79* (2013.01)
*H04L 9/08* (2006.01)

(52) U.S. Cl.
CPC ............ *G06F 21/79* (2013.01); *H04L 9/0822* (2013.01); *H04L 9/0894* (2013.01)

(56) References Cited

U.S. PATENT DOCUMENTS

| | | | |
|---|---|---|---|
| 7,463,739 B2 | 12/2008 | Couillard | |
| 7,596,696 B1 | 9/2009 | Perlman | |
| 8,175,276 B2 | 5/2012 | Tkacik et al. | |
| 9,659,191 B2 | 5/2017 | Cope | |
| 2006/0200682 A1* | 9/2006 | Hars | G06F 21/62 713/193 |
| 2006/0209584 A1 | 9/2006 | Devadas et al. | |
| 2006/0210082 A1* | 9/2006 | Devadas | G11C 7/24 380/277 |
| 2007/0101158 A1* | 5/2007 | Elliott | G06F 12/1408 713/193 |
| 2009/0196418 A1 | 8/2009 | Tkacik et al. | |
| 2010/0005317 A1* | 1/2010 | Pribadi | G06F 21/79 713/193 |
| 2012/0011294 A1 | 1/2012 | Shankar et al. | |
| 2012/0069995 A1 | 3/2012 | Matthews, Jr. | |
| 2012/0201379 A1 | 8/2012 | Fuchs et al. | |
| 2018/0165479 A1* | 6/2018 | Chen | H04L 9/0819 |

OTHER PUBLICATIONS

Notification Concerning Transmittal of International Preliminary Report on Patentability dated Aug. 13, 2020 re: Int'l Appln. No. PCT/US2019/015765. 9 pages.

Notification of Transmittal of the International Search Report and the Written Opinion of the International Searching Authority, or the Declaration dated Apr. 30, 2019 re: Int'l Appln. No. PCT/US2019/015765. 10 Pages.

Schellekens, Dries et al., "Embedded Trusted Computing With Authenticated Non-Volatile Memory", First International Conference on Trusted Computing and Trust in Information Technologies, Trust 2008 Villach, Austria, Mar. 11-12, 2008. Retrieved on Apr. 2, 2019 (Apr. 2, 2019) from <https://www.esat.kuleuven.be/cosic/publications/article-1013.pdf> entire document. 18 Pages.

* cited by examiner

US 11,416,625 B2

PROTECTING CRYPTOGRAPHIC KEYS STORED IN NON-VOLATILE MEMORY

RELATED APPLICATIONS

This application is the U.S. national stage under 35 U.S.C. § 371 of International Application Number PCT/US2019/015765, filed Jan. 30, 2019, which claims the priority benefit of U.S. Provisional Application No. 62/624,694, filed Jan. 31, 2018 and the priority benefit of U.S. Provisional Application No. 62/679,317, filed Jun. 1, 2018. The entire contents of the above-referenced applications are incorporated by reference herein.

TECHNICAL FIELD

The present disclosure is generally related to computer systems, and is more specifically related to cryptographic data processing systems and methods.

BACKGROUND

Since the advent of computers, constantly evolving have been not only various systems and methods for safeguarding cryptographic keys and/or other sensitive data, but also systems and methods for gaining unauthorized access to the protected data, ranging from conceptually unsophisticated brute force password cracking to complex external monitoring attacks.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
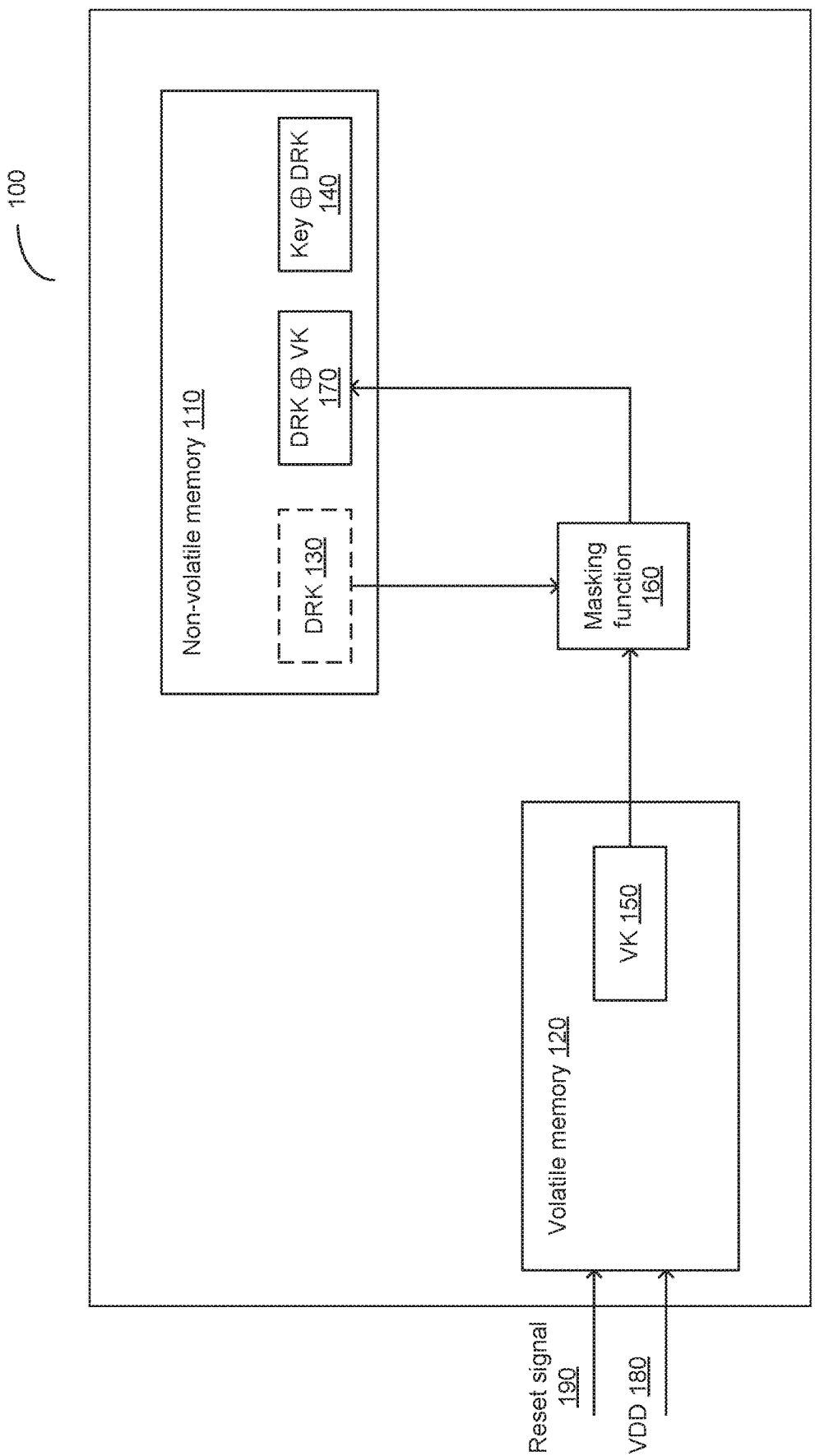
FIG. 1 schematically illustrates the initialization sequence of an example cryptographic data processing device implementing the methods of the present disclosure for protecting cryptographic keys utilized for performing cryptographic data processing operations.

Described herein are systems and methods for protecting cryptographic keys utilized for performing cryptographic data processing operations.

"Cryptographic data processing operation" herein shall refer to a data processing operation involving secret parameters (e.g., encryption/decryption operations using cryptographic keys). "Cryptographic data processing device" herein shall refer to a data processing device (e.g., a general purpose or specialized processor, a system-on-chip, a cryptographic hardware accelerator, or the like) configured or employed for performing cryptographic data processing operations.

A cryptographic data processing device may securely manage one or more cryptographic keys which may be utilized for performing cryptographic data processing operations. Certain cryptographic applications and standards require that the cryptographic keys be securely destroyed (e.g., overwritten with a specified data pattern, such as all zeroes) upon detecting a tampering attempt with respect to the cryptographic data processing device. However, if one or more cryptographic keys are stored in a non-volatile memory, such as flash memory or one-time programmable (OTP) memory, the cryptographic data processing device cannot be assumed to have sufficient time or power to securely destroy the cryptographic keys.

This issue can be addressed by storing the cryptographic keys or key splits (i.e., one or more values from which the cryptographic keys may be derived) in a volatile memory such as Static Random Access Memory (SRAM). The volatile memory may be powered by a dedicated power source, such as a battery. Erasing the volatile keys or key splits would only require interrupting power supply to the volatile memory responsive to detecting a tampering attempt. All other cryptographic keys used by the cryptographic data processing device may be derived from the volatile keys or volatile key splits.

However, this approach would not be suitable if one or more cryptographic keys need to be programmed into the cryptographic data processing device in the absence of a constant power supply, which is necessary to hold the volatile keys. In an illustrative example, a device root key (DRK) may be programmed into the cryptographic data processing device as part of the manufacturing workflow, before a battery is connected to the volatile memory.

Systems and methods of the present disclosure address the above noted and other deficiencies by providing a method of protecting cryptographic keys which involves storing a device root key in a masked form, such that the masking operation involves combining the device root key with a volatile key, which may be stored in the volatile memory and thus may be securely destroyed by interrupting the power supply to the volatile memory.

The device root key may be self-generated by the device or loaded from an external source. All other cryptographic keys utilized by the device may be derived from the device root key and may be stored in the non-volatile memory in a masked form, such that the masking operation involves combining a cryptographic key with the device root key (e.g., by a bitwise exclusive disjunction operation, also referred to as "exclusive OR" or XOR).

The result of the single-bit exclusive disjunction is true (binary 1), if and only if one of the two operands is true; otherwise, the result is false (binary 0). Therefore, the result of applying the exclusive disjunction operation to two equal operands is always false. Applying the exclusive disjunction operation to any operand and binary 0 produces the result which is equal to that operand. Therefore, a cryptographic key K can be masked by the device root key using the exclusive disjunction operation: $K^*=K \oplus DRK$; to remove the mask, the exclusive disjunction is performed on the masked key and the device root key:

$$K=K^* \oplus DRK = (K \oplus DRK) \oplus DRK = K \oplus (DRK \oplus DRK) = K \oplus 0 = K.$$

Accordingly, the cryptographic key, which is stored in the volatile memory in the masked form ($K^*=K \oplus DRK$), may be unmasked using the device root key ($K=K^* \oplus DRK$) prior to being utilized in a cryptographic data processing operation.

Since restoring any cryptographic key would require the device root key, securely destroying the device root key if a tampering event is detected would effectively destroy the cryptographic key. In order to achieve secure device root key erasure, the device root key may be stored in the non-volatile memory in a masked form, such that the masking operation involves combining the device root key with a volatile key (e.g., by a bitwise exclusive disjunction operation):

$$DRK^* = DRK \oplus VK,$$

where $DRK^*$ is the masked device root key, and VK is the volatile key (or volatile key split, which is the value utilized for deriving the volatile key).

The volatile key may be self-generated by the device or loaded from an external source, and may be stored in the volatile memory prior to the device becoming operational, at which point the volatile memory is assumed to have a constant power supply.

After storing the masked device root key, the original device root key is erased from non-volatile memory. Restoring a cryptographic key derived from the device root key would thus require restoring the device root key from the masked form by the unmasking operation using the volatile key: $DRK=DRK^* \oplus VK$. Accordingly, erasing the volatile key from the volatile memory would effectively erase all cryptographic keys in the system. As noted herein above, erasing the volatile key from the volatile memory would only require interrupting the power supplied to the volatile memory.

Thus, the systems and methods described herein represent improvements to the functionality of general purpose or specialized computing devices, by enabling secure handling of cryptographic keys by such devices.

The systems and methods described herein may be implemented by hardware (e.g., general purpose and/or specialized processing devices, and/or other devices and associated circuitry), software (e.g., instructions executable by a processing device), or a combination thereof. Various aspects of the methods and systems are described herein by way of examples, rather than by way of limitation.

FIG. 1 schematically illustrates the initialization sequence of an example cryptographic data processing device 100 implementing the methods of the present disclosure for protecting cryptographic keys utilized for performing cryptographic data processing operations. As shown in FIG. 1, the example device 100 may include a non-volatile memory (e.g., flash memory) 110, and a volatile memory 120 (e.g., SRAM). As part of the device manufacturing workflow, the device root key (DRK) 130, from which all other cryptographic keys would then be derived, may be stored in the non-volatile memory 110. Alternatively, the device root key may be stored in the non-volatile memory 110 as part of the device initialization sequence, which may involve generating the device root key or receiving it from an external source.

The device initialization sequence may further involve generating or receiving from an external source one or more cryptographic keys, which may be utilized by the device 100 for performing various cryptographic data processing operations. The cryptographic keys may be stored in the non-volatile memory 110 in the masked form 140, such that the masking operation involves combining a cryptographic key with the device root key 130 (e.g., by a bitwise exclusive disjunction operation).

The device initialization sequence may further involve generating a volatile key 150 (or one or more volatile key splits, from which the volatile key may then be derived) or receiving the volatile key 150 (or one or more volatile key splits) from an external source. The volatile key 140 may be stored in the volatile memory 120.

The device initialization sequence may further involve combining the volatile key 150 and the device root key 130 by the masking function 160, thus producing the masked device root key 170. In an illustrative example, the masking function 160 may produce the masked device root key $DRK^*$ by applying the bitwise exclusive disjunction operation to its inputs: $DRK^*=DRK \oplus VK$. Alternatively, other masking functions may be used. After storing the masked device root key 170 in the non-volatile memory 110, the original device root key 130 may be erased from the non-volatile memory 110.

Accordingly, restoring a cryptographic key derived from the device root key 130 would involve restoring the device root key 130 from the masked form 170 by the unmasking operation using the volatile key 150: $DRK=DRK^* \oplus VK$, and then restoring the cryptographic key from the masked form 140 by applying the unmasking operation using the restored device root key 130: $K=(K \oplus DRK) \oplus DRK$. Thus, erasing the volatile key from the volatile memory would effectively erase all cryptographic keys in the system. In various illustrative examples, erasing the volatile key from the volatile memory 120 may be performed by interrupting the power supply 180 to the volatile memory 120 or asserting the reset signal 190 to the volatile memory 120.

Figure 2:
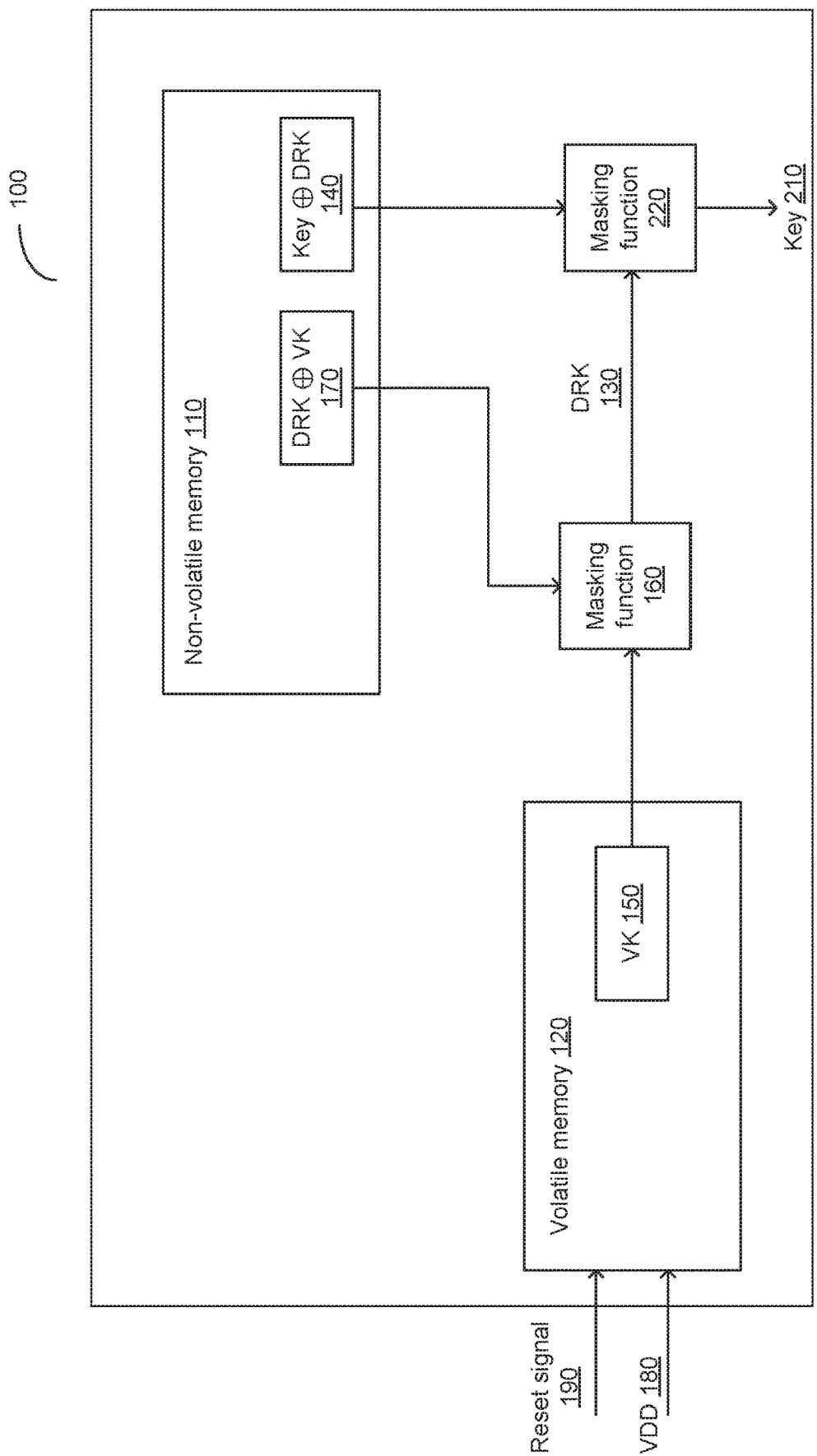
FIG. 2 schematically illustrates the key retrieval sequence of the example cryptographic data processing device.

In operation, one or more cryptographic keys which are stored in the masked form 140 may be unmasked prior to being utilized for performing various cryptographic data processing operations. FIG. 2 schematically illustrates the key retrieval sequence of the example cryptographic data processing device 100. As shown in FIG. 2, the device root key 130 may be restored from its masked form 170 by applying the masking function 160 to the volatile key 150 and the masked form 170 of the device root key: $DRK=DRK^* \oplus VK$. The cryptographic key 210 may then be restored from its masked form 140 by applying the masking function 220 to the device root key 130 and the masked form 140 of the cryptographic key: $K=(K \oplus DRK) \oplus DRK$. In an illustrative example, the masking functions 160 and 220 may apply the bitwise exclusive disjunction operation to their respective inputs. Alternatively, other masking functions may be used. As noted herein above, the unmasked cryptographic key 210 may be utilized for performing various cryptographic data processing operations.

Figure 3:
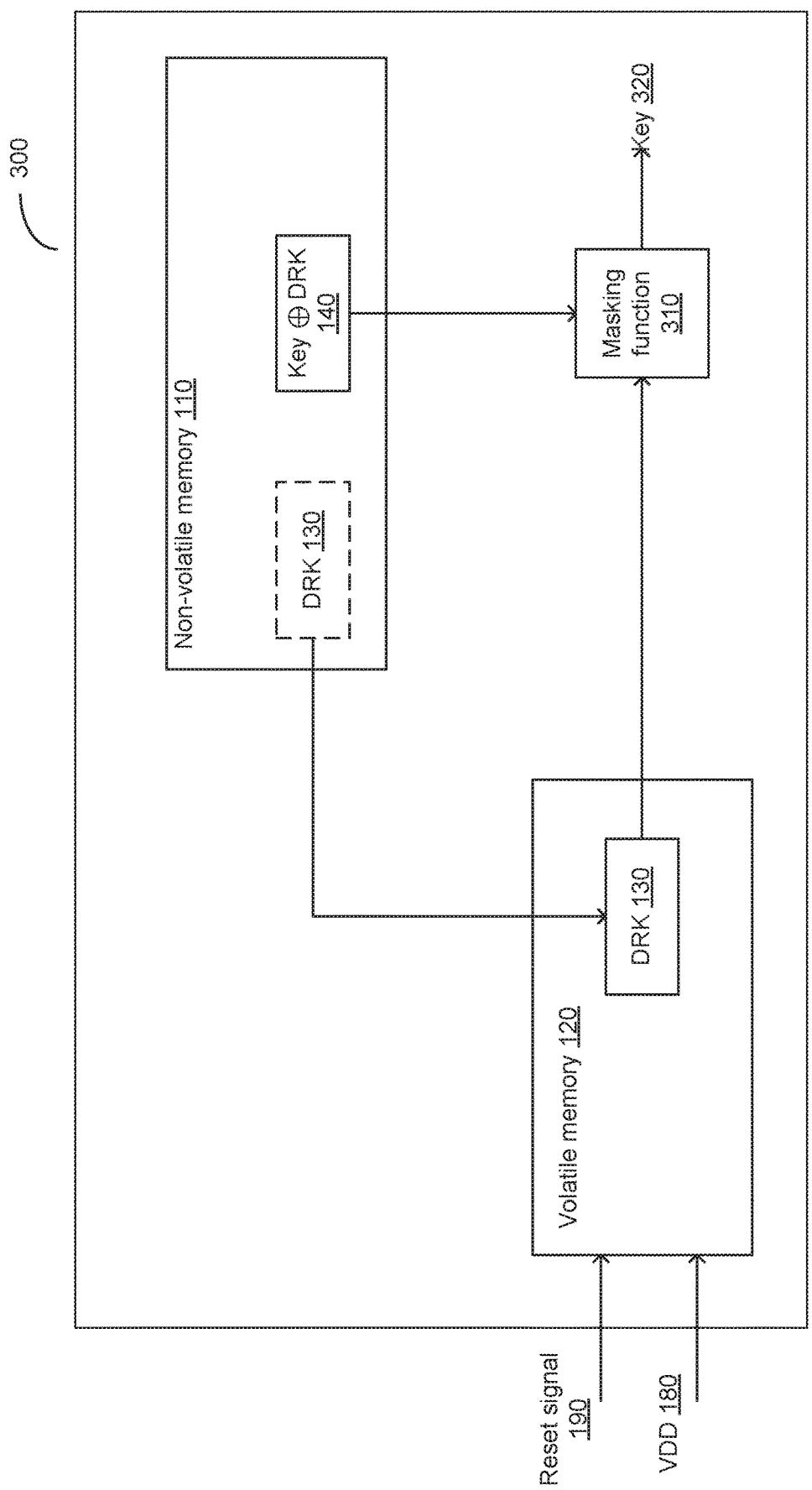
FIG. 3 schematically illustrates another example of device initialization and key retrieval sequences of the cryptographic data processing device 100 implementing the methods of the present disclosure for protecting cryptographic keys utilized for performing cryptographic data processing operations.

FIG. 3 schematically illustrates another example of device initialization and key retrieval sequences of the cryptographic data processing device 300 implementing the methods of the present disclosure for protecting cryptographic keys utilized for performing cryptographic data processing operations. As shown in FIG. 3, as part of the device manufacturing workflow, the device root key (DRK) 130, from which all other cryptographic keys would then be derived, may be stored in the non-volatile memory 110. Alternatively, the device root key may be stored in the non-volatile memory 110 as part of the device initialization sequence, which may involve generating the device root key or receiving it from an external source.

The device initialization sequence may further involve generating or receiving from an external source one or more cryptographic keys, which may be utilized by the device 300 for performing various cryptographic data processing operations. The cryptographic keys may be stored in the non-volatile memory 110 in the masked form 140, such that the masking operation involves combining a cryptographic key with the device root key 130 (e.g., by a bitwise exclusive disjunction operation). The device initialization sequence may further involve copying the device root key to the volatile memory 120. After storing the device root key 130 in the volatile memory 120, the original device root key 130 may be erased from the non-volatile memory 110.

Accordingly, a cryptographic key derived from the device root key 130 may be restored from its masked form 140 by the unmasking function 310 using the device root key 130: $K=(K \oplus DRK) \oplus DRK$. In an illustrative example, the masking function 310 may apply the bitwise exclusive disjunction operation to their respective inputs. Alternatively, other masking functions may be used. As noted herein above, the unmasked cryptographic key 320 may be utilized for performing various cryptographic data processing operations.

Accordingly, erasing the device root key from the volatile memory would effectively erase all cryptographic keys in the system. In various illustrative examples, erasing the device root key from the volatile memory 120 may be performed by interrupting the power supply 180 to the volatile memory 120 or asserting the reset signal 190 to the volatile memory 120.

Figure 4:
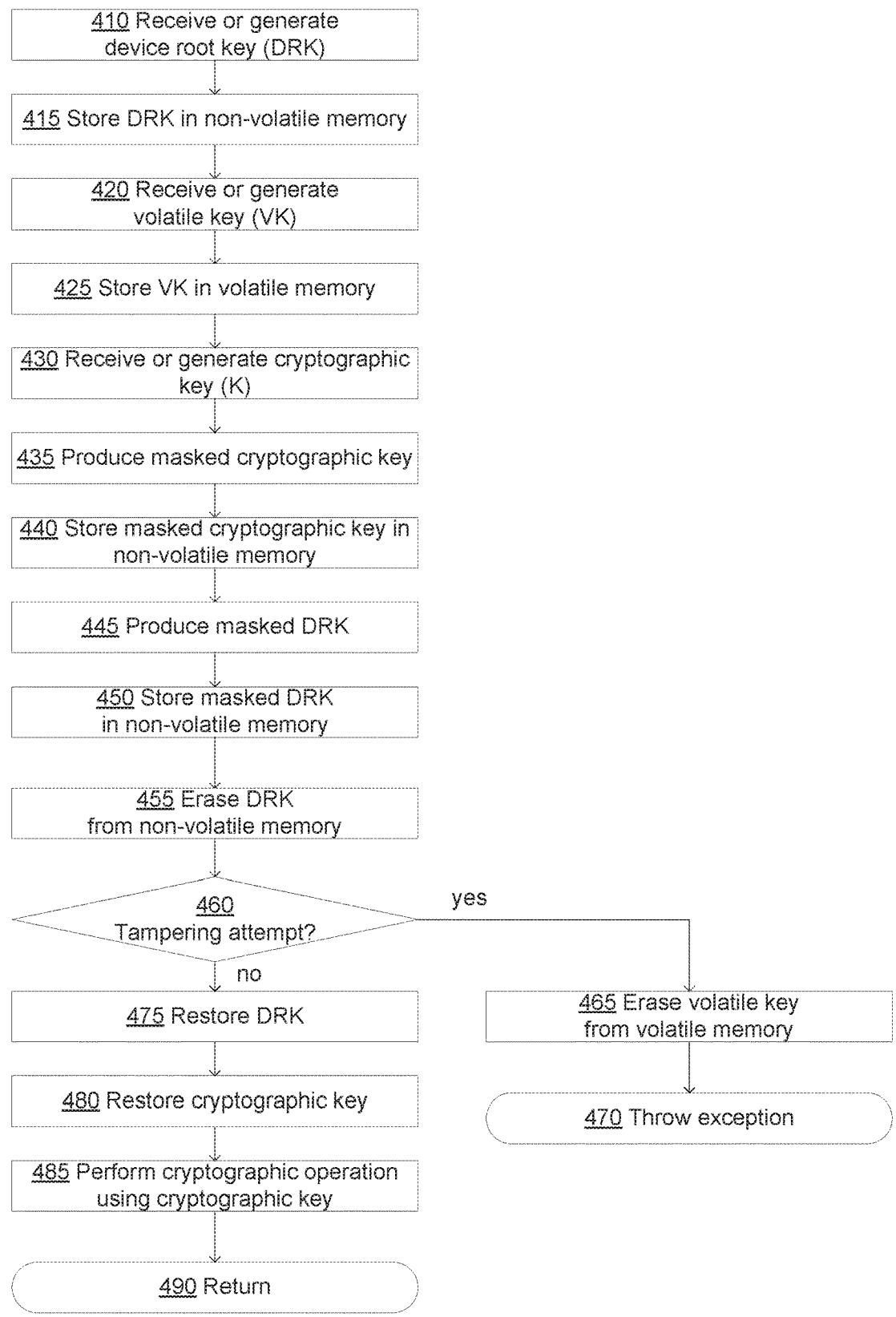
FIG. 4 depicts a flow diagram of an example method for protecting cryptographic keys utilized for performing cryptographic data processing operations, in accordance with one or more aspects of the present disclosure.

FIG. 4 depicts a flow diagram of an example method 400 for protecting cryptographic keys utilized for performing cryptographic data processing operations, in accordance with one or more aspects of the present disclosure. Method 400 and/or each of its individual functions, routines, subroutines, or operations may be performed by one or more general purpose and/or specialized processing devices. Two or more functions, routines, subroutines, or operations of method 400 may be performed in parallel or in an order that may differ from the order described above. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. In an illustrative example, method 400 may be performed by the computing system 1000 described herein below with references to FIG. 6.

Referring to FIG. 4, at block 410, a cryptographic data processing device implementing the method may receive from an external source or generate a device root key, which may be provided by a bit sequence of an arbitrary length. In an illustrative example, the device root key may be programmed into the cryptographic data processing device as part of the manufacturing workflow. Alternatively, the device root key may be generated by the cryptographic data processing device as part of the device initialization sequence, as described in more detail herein above.

At block 415, the cryptographic data processing device may store the device root key in a non-volatile memory. In an illustrative example, the non-volatile memory may be provided by flash memory, as described in more detail herein above.

At block 420, the cryptographic data processing device may receive from an external source or generate a volatile key, which may be provided by a bit sequence of an arbitrary length.

At block 425, the cryptographic data processing device may store the volatile key in a volatile memory. In an illustrative example, the volatile memory may be provided by SRAM, as described in more detail herein above.

At block 430, the cryptographic data processing device may receive from an external source or generate a cryptographic key, which may be provided by a bit sequence of an arbitrary length, to be utilized for performing various cryptographic data processing operations.

At block 435, the cryptographic data processing device may produce a masked cryptographic key by combining the cryptographic key and the device root key. In an illustrative example, the masking operation may involve applying the exclusive disjunction operation to the cryptographic key and the device root key: $K^*=K \oplus DRK$, as described in more detail herein above.

At block 440, the cryptographic data processing device may store the masked cryptographic key in the non-volatile memory.

At block 445, the cryptographic data processing device may produce a masked device root key by combining the device root key and the volatile key. In an illustrative example, the masking operation may involve applying the exclusive disjunction operation to the device root key and the volatile key: $DRK^*=DRK \oplus VK$, as described in more detail herein above.

At block 450, the cryptographic data processing device may store the masked device root key in the non-volatile memory.

At block 455, the cryptographic data processing device may erase the device root key from the non-volatile memory.

Responsive to detecting, at block 460, a tampering event, the cryptographic data processing device may, at block 465, erase the volatile key from the volatile memory, and the method may terminate, e.g., by throwing an exception at block 470.

Otherwise, at block 475, the cryptographic data processing device may, responsive to receiving a request to perform a cryptographic data processing operation, restore the device root key by combining the masked device root key and the volatile key. In an illustrative example, the unmasking operation may involve applying the exclusive disjunction operation to the masked device root key and the volatile key: $DRK=DRK^* \oplus VK$, as described in more detail herein above.

At block 480, the cryptographic data processing device may restore the cryptographic key by combining the masked cryptographic key and the restored device root key. In an illustrative example, the unmasking operation may involve applying the exclusive disjunction operation to the masked cryptographic key and the restored device root key: $K=K^* \oplus DRK$, as described in more detail herein above.

At block 485, the cryptographic data processing device may utilize the cryptographic key for performing a cryptographic data processing operation, and the method may terminate at block 490.

Figure 5:
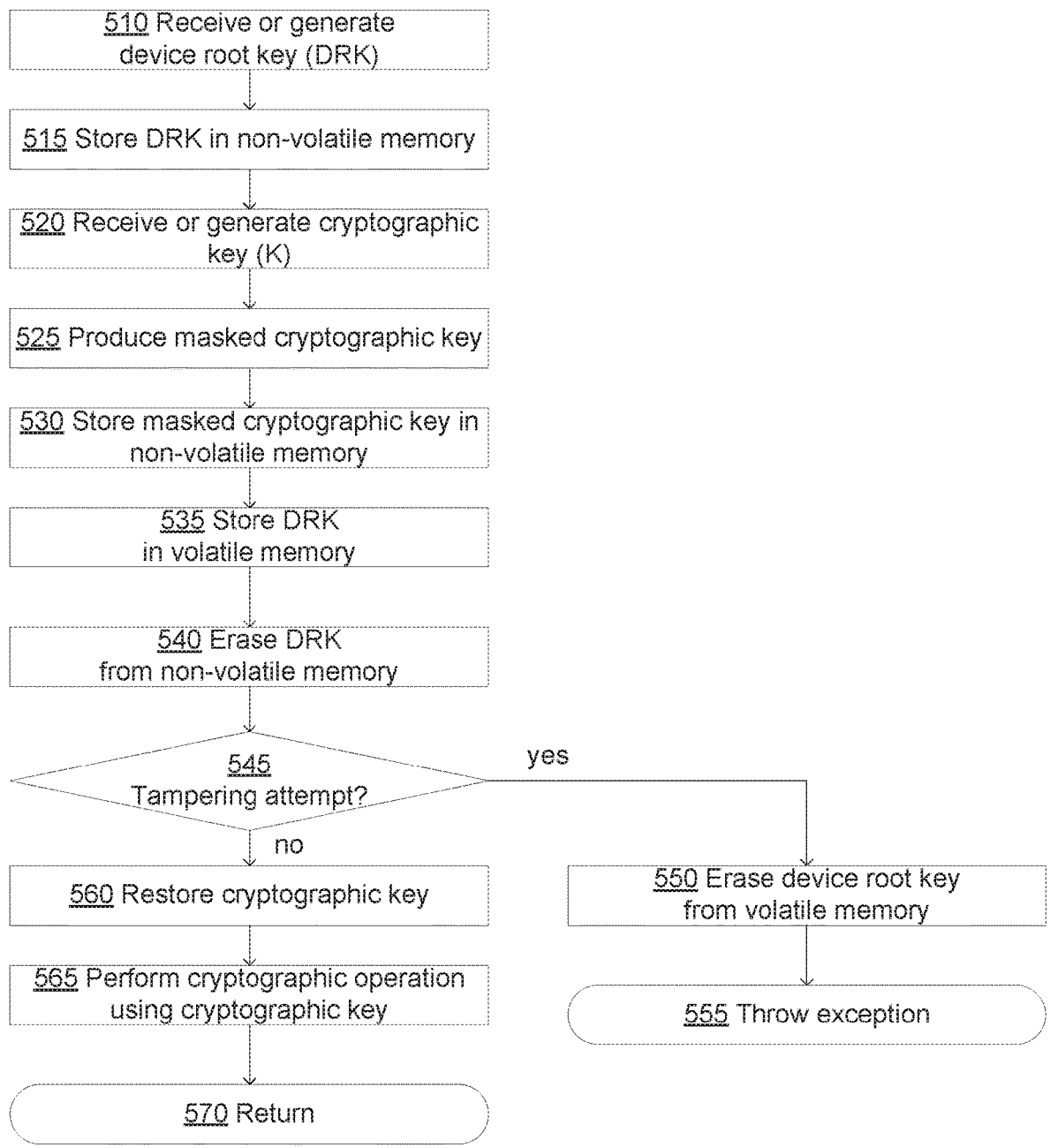
FIG. 5 depicts a flow diagram of another example method for protecting cryptographic keys utilized for performing cryptographic data processing operations, in accordance with one or more aspects of the present disclosure.

FIG. 5 depicts a flow diagram of an example method 500 for protecting cryptographic keys utilized for performing cryptographic data processing operations, in accordance with one or more aspects of the present disclosure. Method 500 and/or each of its individual functions, routines, subroutines, or operations may be performed by one or more general purpose and/or specialized processing devices. Two or more functions, routines, subroutines, or operations of method 500 may be performed in parallel or in an order that may differ from the order described above. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. In an illustrative example, method 500 may be performed by the computing system 1000 described herein below with references to FIG. 6.

Referring to FIG. 5, at block 510, a cryptographic data processing device implementing the method may receive from an external source or generate a device root key, which may be provided by a bit sequence of an arbitrary length. In an illustrative example, the device root key may be programmed into the cryptographic data processing device as part of the manufacturing workflow. Alternatively, the device root key may be generated by the cryptographic data processing device as part of the device initialization sequence, as described in more detail herein above.

At block 515, the cryptographic data processing device may store the device root key in a non-volatile memory. In an illustrative example, the non-volatile memory may be provided by flash memory, as described in more detail herein above.

At block 520, the cryptographic data processing device may receive from an external source or generate a cryptographic key, which may be provided by a bit sequence of an arbitrary length, to be utilized for performing various cryptographic data processing operations.

At block 525, the cryptographic data processing device may produce a masked cryptographic key by combining the cryptographic key and the device root key. In an illustrative example, the masking operation may involve applying the exclusive disjunction operation to the cryptographic key and the device root key: $K^* = K \oplus DRK$, as described in more detail herein above.

At block 530, the cryptographic data processing device may store the masked cryptographic key in the non-volatile memory.

At block 535, the cryptographic data processing device may store the device root key in the volatile memory.

At block 540, the cryptographic data processing device may erase the device root key from the non-volatile memory.

Responsive to detecting, at block 545, a tampering event, the cryptographic data processing device may, at block 550, erase the device root key from the volatile memory, and the method may terminate, e.g., by throwing an exception at block 555.

Otherwise, at block 560, the cryptographic data processing device may, responsive to receiving a request to perform a cryptographic data processing operation, restore the cryptographic key by combining the masked cryptographic root key and the device root key. In an illustrative example, the unmasking operation may involve applying the exclusive disjunction operation to the masked cryptographic root key and the device root key: $K = K^* \oplus DRK$, as described in more detail herein above.

At block 565, the cryptographic data processing device may utilize the cryptographic key for performing a cryptographic data processing operation, and the method may terminate at block 570.

Figure 6:
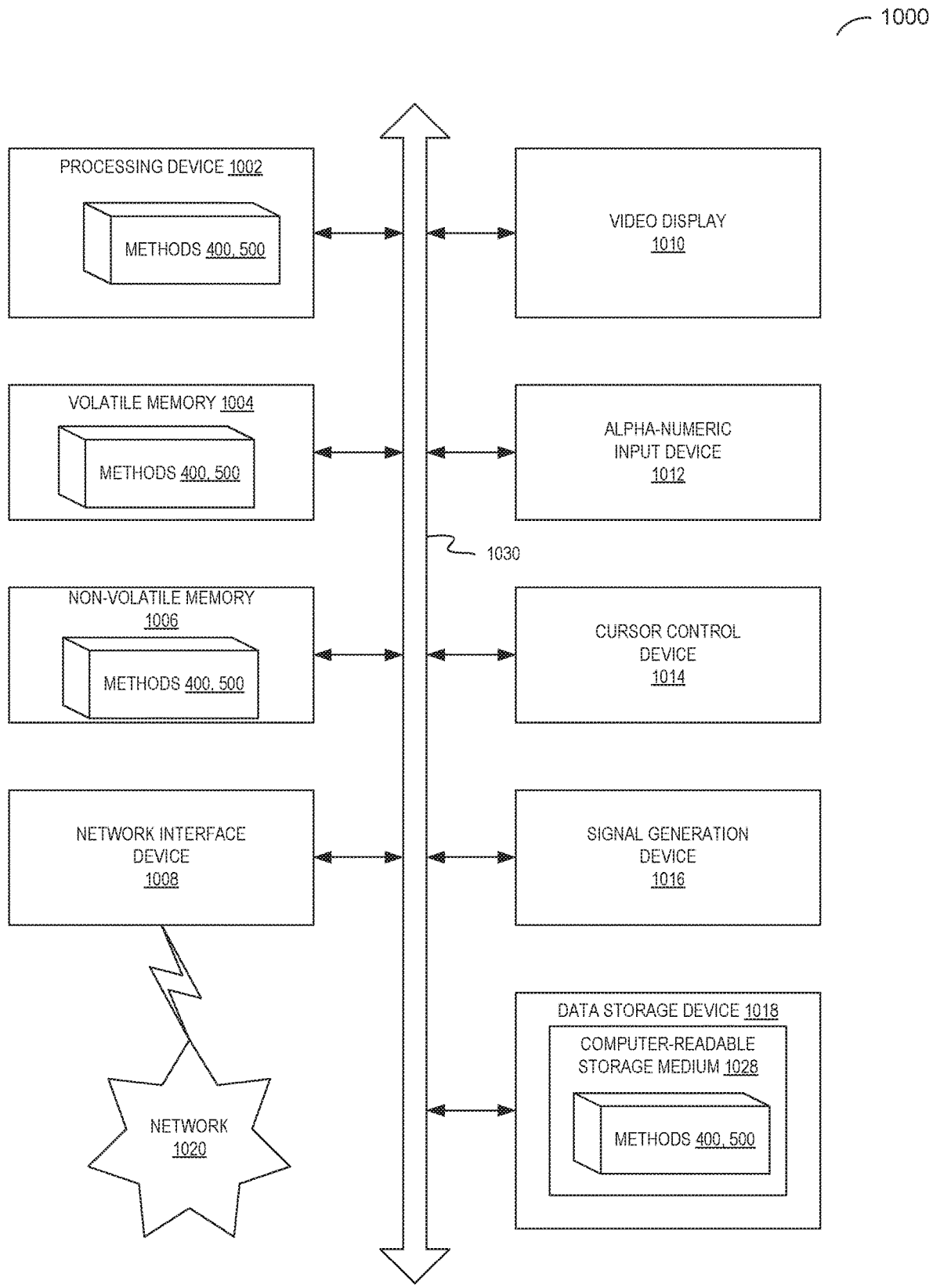
FIG. 6 illustrates a diagrammatic representation of an example computing system within which a set of instructions, for causing the computing device to perform the methods described herein, may be executed.

FIG. 6 illustrates a diagrammatic representation of a computing system 1000 which may incorporate the processing device described herein and within which a set of instructions, for causing the computing device to perform the methods described herein, may be executed. Computing system 1000 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods described herein.

The example computing system 1000 may include a processing device 1002, which in various illustrative examples may be a general purpose or specialized processor comprising one or more processing cores. The example computing system 1000 may further comprise a volatile memory 1004 (e.g., SRAM)), a non-volatile memory 1006 (e.g., flash memory), and a data storage device 1018, which may communicate with each other via a bus 1030.

The processing device 1002 may be configured to execute methods 400, 500 for protecting cryptographic keys utilized for performing cryptographic data processing operations, in accordance with one or more aspects of the present disclosure for performing the operations and steps described herein.

The example computing system 1000 may further include a network interface device 1008 which may communicate with a network 1020. The example computing system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, the video display unit 1010, the alphanumeric input device 1012, and the cursor control device 1014 may be combined into a single component or device (e.g., an LCD touch screen).

The data storage device 1018 may include a computer-readable storage medium 1028 on which may be stored one or more sets of instructions (e.g., instructions of methods 400, 500) implementing any one or more of the methods or functions described herein. Instructions implementing methods 400, 500 may also reside, completely or at least partially, within the main memory 1004 and/or within the processing device 1002 during execution thereof by the example computing system 1000, hence the main memory 1004 and the processing device 1002 may also constitute or comprise computer-readable media. The instructions may further be transmitted or received over the network 1020 via the network interface device 1008.

While the computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
   storing a device root key in a non-volatile memory;
   storing a volatile key in a volatile memory;
   storing a masked cryptographic key in the non-volatile memory, wherein the masked cryptographic key is produced by combining a cryptographic key and the device root key;
   storing a masked device root key in the non-volatile memory, wherein the masked device root key is produced by combining the device root key and the volatile key; and
   erasing the device root key from the non-volatile memory.

2. The method of claim 1, further comprising:
   responsive to detecting a tampering event, erasing the volatile key from the volatile memory.

3. The method of claim 2, wherein erasing the volatile key from the volatile memory further comprises at least one of:
   sending a reset signal to the volatile memory or interrupting power supply to the volatile memory.

4. The method of claim 1, further comprising:
   restoring the device root key by combining the masked device root key and the volatile key;
   restoring the cryptographic key by combining the masked cryptographic key and the device root key; and
   utilizing the cryptographic key for performing a cryptographic data processing operation.

5. The method of claim 1, wherein combining the cryptographic key and the device root key further comprises:
   performing an exclusive disjunction operation of the cryptographic key and the device root key.

6. The method of claim 1, wherein combining the device root key and the volatile key further comprises:
   performing an exclusive disjunction operation of the device root key and the volatile key.

7. The method of claim 1, further comprising:
   receiving, from an external source, at least one of: the device root key, the volatile key, or the cryptographic key.

8. The method of claim 1, further comprising:
   generating at least one of: the device root key; the volatile key, or the cryptographic key.

9. A system comprising:
   a non-volatile memory;
   a volatile memory;
   a voltage control circuit configured to interrupt power supply to the volatile memory responsive to receiving a signal indicating a tampering event; and
   a processor configured to:
      store a device root key in the non-volatile memory;
      store a volatile key in the volatile memory;
      store a masked cryptographic key in the non-volatile memory, wherein the masked cryptographic key is produced by combining a cryptographic key and the device root key;
      store a masked device root key in the non-volatile memory, wherein the masked device root key is produced by combining the device root key and the volatile key; and
      erase the device root key from the non-volatile memory.

10. The system of claim 9, wherein the processor is further configured to:
    restore the device root key by combining the masked device root key and the volatile key;
    restore the cryptographic key by combining the masked cryptographic key and the device root key; and
    utilize the cryptographic key for performing a cryptographic data processing operation.

11. The system of claim 9, wherein combining the cryptographic key and the device root key further comprises:
    performing an exclusive disjunction operation of the cryptographic key and the device root key.

12. A method, comprising:
    storing a device root key in a non-volatile memory;
    storing a masked cryptographic key in the non-volatile memory, wherein the masked cryptographic key is produced by combining a cryptographic key and the device root key;
    storing the device root key in a volatile memory;
    erasing the device root key from the non-volatile memory; and
    responsive to detecting a tampering event, erasing the device root key from the volatile memory.

13. The method of claim 12, wherein erasing the device root key from the volatile memory further comprises:
    sending a reset signal to the volatile memory or interrupting power supply to the volatile memory.

14. The method of claim 12, further comprising:
restoring the cryptographic key by combining the masked cryptographic key and the device root key; and
utilizing the cryptographic key for performing a cryptographic data processing operation.

15. The method of claim 12, wherein combining the cryptographic key and the device root key further comprises:
performing an exclusive disjunction operation of the cryptographic key and the device root key.

16. The method of claim 12, further comprising:
receiving, from an external source, at least one of: the device root key or the cryptographic key.

17. The method of claim 12, further comprising:
generating at least one of: the device root key or the cryptographic key.

18. A system comprising:
a non-volatile memory;
a volatile memory;
a voltage control circuit configured to interrupt power supply to the volatile memory responsive to receiving a signal indicating a tampering event; and
a processor configured to:
store a device root key in the non-volatile memory;
store a masked cryptographic key in the non-volatile memory, wherein the masked cryptographic key is produced by combining a cryptographic key and the device root key;
store the device root key in the volatile memory; and
erase the device root key from the non-volatile memory.

19. The system of claim 18, wherein the processor is further configured to:
restore the cryptographic key by combining the masked cryptographic key and the device root key; and
utilize the cryptographic key for performing a cryptographic data processing operation.

20. The system of claim 18, wherein combining the cryptographic key and the device root key further comprises:
performing an exclusive disjunction operation of the cryptographic key and the device root key.

* * * * *